Sept. 30, 1958  K. SIMON ET AL  2,853,818
PLATE FRAME AND SECURING DEVICE
Filed June 25, 1956

INVENTORS
KALMON SIMON
NEVON VON ROHR
BY
Orville R. Leidner
AGENT

United States Patent Office 2,853,818
Patented Sept. 30, 1958

2,853,818

PLATE FRAME AND SECURING DEVICE

Kalmon Simon, Montebello, and Nevon Von Rohr, Garden Grove, Calif.

Application June 25, 1956, Serial No. 593,626

3 Claims. (Cl. 40—125)

This invention relates to framing devices in general, and particularly relates to a framing device adapted to secure a license plate to an automotive vehicle.

The automotive license plates frames of the prior art have comprised frames fabricated of metals. Most of them have been directed solely to ornamental use, and to this end have served no functional purpose. Some of them cover only the face edges of the license plate, being secured thereto by the same bolts holding the plate on the vehicle, while others are of a collapsible tubular configuration defining a slot extending along the inner periphery adapted to enclose the perimeter of the plate. So far as is known, none of these frames serve any purpose other than ornamentation.

The frame of the present invention, in addition to being of an ornamental nature, is functional in at least two respects, to wit, it serves to protect the edges and back of the plate by preventing entry of water thereto, and, most important, it serves as a means of mounting the plate on the vehicle without the necessity of bolts or the like.

The invention is particularly useful in that it also provides for mounting succeeding year tabs on the plate without the necessity of bolts or the like.

Most of the States are adopting a uniformly sized license plate with standardized mounting holes. This is desirable from the automotive standpoint in that the requirement for adjustable license plate holders will be done away with, thereby cutting down on manufacturing costs. The States are also adopting the idea of providing tabs from year to year rather than issuing new plates at each tax period, thereby cutting down on license plate costs.

The present invention has for its main purpose to provide a combination plate frame and securing device adaptable to license plates of automotive vehicles. A particular purpose is to provide such a device having a web-like member fabricated of a thin resilient membrane adapted to lie intermediate the plate and its fixed support, the automotive bumper for example, so as to eliminate a source of rattles and other random noise. It is a further purpose to provide the web-like membrane with an inturned framing member forming an extension of the edges of the web-like member, the framing member being resiliently biased toward the edges of the web-like member and defining therewith a space wherein the perimeter of the license plate may be received snugly. An important further purpose is to provide the web-like member with resilient knobs so spaced thereon as to be receivable in the plate and car mounting holes, the knobs being characterized by having portions somewhat larger than the mounting holes but adapted to be squeezed therethrough so as to secure the plate to the vehicle.

Other and further purposes will suggest themselves upon consideration of the specification and drawings in which preferred embodiments are shown and described without intent to limit the scope of the invention thereto. It will be apparent, of course, that the structure of the invention lends itself to uses, many of which lie outside the automotive field.

Figure 1:
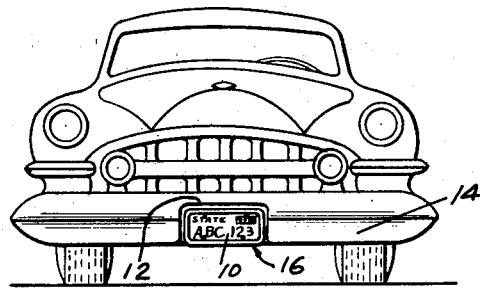
Fig. 1 is a front view of an automobile showing the accessory device of the invention in use.

Referring to Fig. 1, the automobile shown has its license plate 10 mounted in a recess 12 in the front bumper 14, after the current fashion, with the combined frame and securing device 16 of the present invention. The device 16 will be referred to hereinafter as the accessory 16 since its features and construction readily adapt it to sale over the accessory counters of automotive parts stores.

Figure 3:
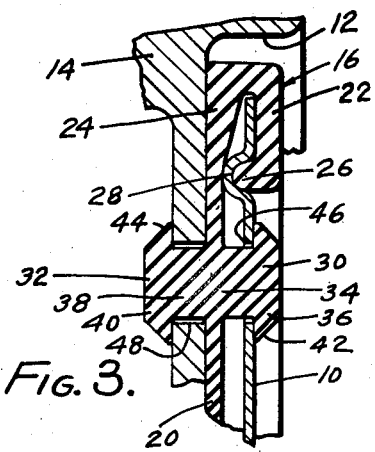
Fig. 3 is an enlarged fragmentary sectional view taken on the line 3—3 of Fig. 2.
Figure 2:
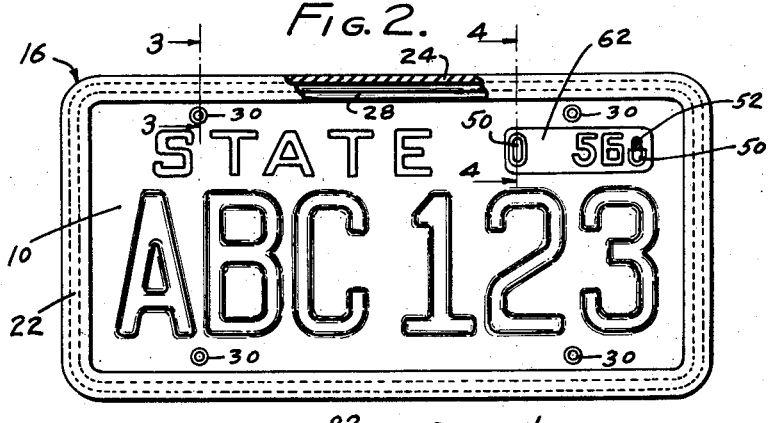
Fig. 2 is a view of an automotive license plate with the device of the invention applied thereto, the frame of the device being partly sectioned.
Figure 4:
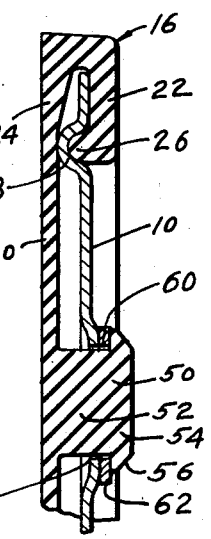
Fig. 4 is a like view taken on the line 4—4 of Fig. 2.

In Figs. 2, 3, and 4 the accessory 16, as used in conjunction with the license plate 10, is shown as comprising the web-like member 20, extending from edge to edge of the plate 10, and the framing member 22 forming an inturned extension of the edge 24, for example, of the web-like member 20. It will be observed that the framing member 22 has a ribbed portion 26 adjacent one edge thereof, the rib 26 being adapted to lie within the groove 28 which extends around the plate 10 adjacent the periphery thereof.

Since the web and frame members 20 and 22 are preferably fabricated of a resilient material such as rubber, it is seen that the periphery of the plate 10 lies snugly within the space defined by the edge 24 and the frame member 22, thereby preventing access of rain water and the like to the bare metal of the plate 10 and thus preventing the formation of rust and corrosion products.

The accessory 16 is further characterized by the forwardly extending knob-like member 30 and the rearwardly extending knob-like member 32 formed integrally with the web-like member 20. The knob-like member 30 comprises a shank portion 34 and a knob portion 36, and the member 32 comprises a shank portion 38 and a knob portion 40. It will be observed that members 30 and 32 are likewise fabricated preferably of resilient material with the knob portions 36 and 40 formed with the laterally extending annular lips 42 and 44, respectively, which latter are adapted to be compressed and forced through the perforations comprising the mounting holes 46 and 48 in the plate 10 and bumper 14, respectively, whereafter the knob portions expand and secure the plate 10 to the bumper 14 through the medium of the accessory device 16.

In Fig. 4, the section through another portion of the license plate 10 and accessory 16 shows a similar knob-like member 50 extending forwardly from the web-like member 20 and similarly characterized by a shank portion 52 and a knob portion 54 having the annular lip 56 formed thereon. The member 50 likewise extends through a further perforation 58 in the plate 10, and, in addition thereto, is adapted to extend through the perforation 60 in the subsequently issued license plate tab 62 to secure the latter to the license plate 10 as required by law.

Figure 5:
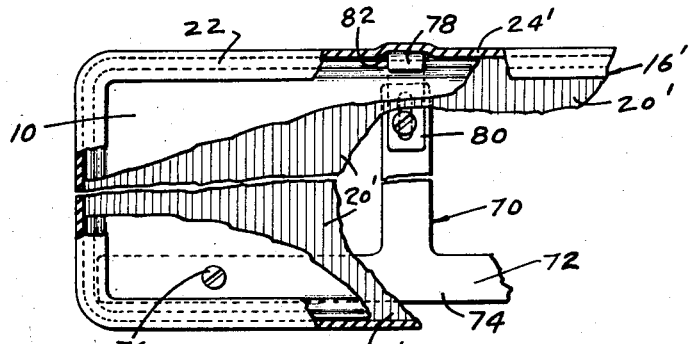
Fig. 5 is a fragmentary view, partly sectioned, showing the invention in use with the adjustable inverted-T type of license plate holder.
Figure 6:
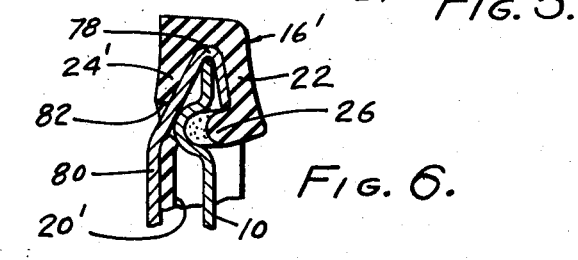
Fig. 6 is an enlarged fragmentary vertical sectional view of Fig. 5.

In Figs. 5 and 6 there is illustrated an adaptation of the accessory to an automotive license plate holder such as those currently popular with many car manufacturers. In this adaptation the license plate mounting means 70, which may be secured to the automotive vehicle in any preferred manner by the car manufacturer, comprises an inverted-T bracket 72 having the lower horizontal member 74 to which the lower portion of the plate 10 may be secured, as by bolts (only one being shown at 76).

The upper portion of the plate 10 is secured against vibration and other movement by the hooked end 78 of the vertical member 80 of the bracket 72, as more clearly shown in Fig. 6.

In this embodiment of the invention, the accessory device 16' comprises a web-like member 20' and the framing member 22 forming an inturned extension of the edge 24' of the member 20'. It will be seen more particularly in Fig. 6 that the edge 24' has a slit 82 cut thereinto through which the upper hooked end 78 of the member 80' is adapted to pass. Further observation will disclose that the framing member 22 overlies both the hooked end 78 of the member 80 and the license plate 10. In all other respects, the accessory 16' is similar to accessory 16, and may even be provided with knob-like members on its lower portion (such as those shown in Fig. 3) to eliminate the requirement for plate holding bolts such as that shown at 76. Such an extension of the invention to the embodiment of Figs. 5 and 6 is obvious.

It will be apparent, of course, that the present invention is very adaptable to uses other than the framing and securing of a license plate to an automotive vehicle. One such use which comes readily to mind is the framing and securing of nameplates or plaques to machines or even to building structures. Other such uses will suggest themselves at once to those skilled in the art.

We claim:

1. An accessory for use with a perforate plate, comprising: a web-like member including a backing portion adapted to lie along the back side of said plate from edge to edge thereof; a framing member forming an inturned extension of the edges of said web-like member, said framing member being resiliently biased toward the edges of said web-like member, whereby said plate may be mounted on said accessory with the perimeter of said plate disposed and snugly received within the space intermediate said framing member and the edges of said web-like member; and a knob-like member extending forwardly from said web-like member, said knob-like member having a shank portion adapted to be received within a perforation in said plate, and further having a resiliently compressible knob portion dimensionally larger than the perforation and adapted to be compressed so as to pass through the perforation whereafter the knob portion may expand and thereby secure said plate and said web-like member closely adjacent each other.

2. An accessory for securing a plate to a fixed support having a perforation therein, comprising: a web-like member including a backing portion adapted to lie along the back side of said plate from edge to edge thereof; a framing member forming an inturned extension of the edges of said web-like member, said framing member being resiliently biased toward the edges of said web-like member, whereby said plate may be mounted on said accessory with the perimeter of said plate disposed and snugly received within the space intermediate said framing member and the edges of said web-like member; and a knob-like member extending rearwardly from said web-like member, said knob-like member having a shank portion adapted to be received within the perforation in said fixed support, and further having a resiliently compressible knob portion dimensionally larger than the perforation and adapted to be compressed so as to pass through the perforation whereafter the knob portion may expand and thereby secure said web-like member and said fixed support closely adjacent each other.

3. An accessory for securing a perforate plate to a fixed support having a perforation therein, comprising: a web-like member including a backing portion adapted to lie along the back side of said plate from edge to edge thereof; a framing member forming an inturned extension of the edges of said web-like member, said framing member being resiliently biased toward the edges of said web-like member, whereby said plate may be mounted on said accessory with the perimeter of said plate disposed and snugly received within the space intermediate said framing member and the edges of said web-like member; a first knob-like member extending forwardly from said web-like member; and a second knob-like member extending rearwardly from said web-like member, both of said knob-like members having shank portions adapted to be received within the respective plate and fixed support perforations; and further having resiliently compressible knob portions dimensionally larger than the perforations and adapted to be compressed so as to pass through the perforations whereafter the knob portions may expand and thereby secure said plate, web-like member, and fixed support closely adjacent each other.

References Cited in the file of this patent

UNITED STATES PATENTS

| 2,003,343 | Davis | June 4, 1935 |
| 2,082,434 | White | June 1, 1937 |

FOREIGN PATENTS

| 404,657 | Great Britain | Jan. 18, 1934 |